United States Patent

Youssef et al.

Patent Number: 5,124,118
Date of Patent: Jun. 23, 1992

[54] METHOD OF MANUFACTURING A BRAKE LINING COMPRISING NON-CONTIGUOUS SHEATHED STUDS, AND THE LINING OBTAINED THEREBY

[75] Inventors: Hassan Youssef, Taverny; Yves Bigay, Versailles, both of France

[73] Assignee: Le Carbone Lorraine, Courbevoie, France

[21] Appl. No.: 701,831

[22] Filed: May 17, 1991

[30] Foreign Application Priority Data

May 18, 1990 [FR] France ................. 90 06602

[51] Int. Cl.⁵ .............................................. B22F 7/00
[52] U.S. Cl. .............................. 419/9; 419/28; 419/29; 419/38; 419/49; 419/53; 419/54; 419/55; 419/57
[58] Field of Search ............... 419/9, 28 29, 38, 49, 419/53, 54, 55, 57

[56] References Cited

U.S. PATENT DOCUMENTS

| | | | |
|---|---|---|---|
| 3,946,192 | 3/1976 | Allen et al. | 419/8 |
| 4,050,619 | 9/1977 | Tarr | 228/162 |
| 4,050,620 | 9/1977 | Kwolek et al. | 228/162 |
| 4,234,327 | 11/1980 | Putz | 419/9 |
| 4,277,544 | 7/1981 | Pietrocini | 419/8 |
| 4,278,153 | 7/1981 | Venbatu | 419/8 |
| 4,456,578 | 6/1984 | Ward | 419/8 |
| 4,576,872 | 3/1986 | Ward | 419/8 |
| 4,770,283 | 9/1988 | Putz et al. | 419/8 |
| 4,883,638 | 11/1989 | Blankinhagen et al. | 419/9 |

FOREIGN PATENT DOCUMENTS

| | | |
|---|---|---|
| 0026578 | 4/1981 | European Pat. Off. . |
| 1259664 | 3/1961 | France . |
| 2350512 | 12/1977 | France . |
| 8302651 | 8/1983 | PCT Int'l Appl. . |
| 8706315 | 10/1987 | PCT Int'l Appl. . |

*Primary Examiner*—Stephen J. Lechert, Jr.
*Attorney, Agent, or Firm*—Dennison, Meserole, Pollack & Scheiner

[57] ABSTRACT

A method for manufacturing a brake fitting comprising a plurality of studs each surrounded by a less fragile belt, the studs being non-contiguously secured to a metal support. According to the method, the support is provided with a slip-resistant surface by coating with a braze welding suspension which is oxidized and reduced. Stud blanks then are molded and compacted from powdered friction products and belt blanks are molded and compacted from metal powders and given an internal diameter 1.005 to 1.05 times the external diameter of the stud blanks, and the belt blanks are disposed around the stud blanks and sintered, obtaining sheathed stud blanks which are placed on the slip resistant surface of the support, and welded thereto by heat treatment. Finally, the sheathed stud blanks are forged at over 400 degree C., shortening them by at least 15%.

11 Claims, 2 Drawing Sheets

METHOD OF MANUFACTURING A BRAKE LINING COMPRISING NON-CONTIGUOUS SHEATHED STUDS, AND THE LINING OBTAINED THEREBY

The invention relates to a method of manufacturing a brake fittings based on bronze or iron and comprising a number of studs secured to a metal plate or support. The invention also relates to the fitting obtained thereby.

Known fittings delivered by the Applicant comprise separate studs secured to a metal support each stud having a cylindrical casing made of a less fragile sintered metal product and adapted to protect the friction product and prevent notching. The studs are secured to the metal support individually, e.g. by a bead connecting the foot of the stud to the support or bed, or by means of an intermediate metal base. In the case where the studs are circular and cylindrical, they sometimes vary in diameter and height, inter alia because of the method of manufacturing each stud individually.

The Applicants have tried to develop a method of manufacture which is simpler and more economic, avoiding the aforementioned disadvantages and if possible improving the efficiency with which the studs are secured to the support.

SUMMARY OF THE INVENTION

The invention relates firstly to a method of manufacturing a brake fitting in which a number of studs made of sintered friction products, each sheathed by an annular sintered metal belt, are secured to a metal substrate, the sheathed studs being non-contiguous. According to the invention, the method comprises the following steps:

(a) a surface of the metal support is made slip-resistant by the following successive operations:
  a surface of the support is degreased and/or sanded and coated with a suspension of braze-welding powder in an organic liquid;
  all traces of carbon are eliminated from the coating by hot oxidation thereof, and
  the oxides formed are reduced by heat-treating the coated substrate in a reducing atmosphere, the coated surface becoming then the slip-resistant surface;

(b) powdered friction products on the one hand are moulded and compacted in the form of stud blanks and metal powders on the other hand are moulded and compacted in the form of annular belt blanks having an internal diameter 1.005 to 1.050 times the external diameter of the stud blanks;

(c) the annular belt blanks are disposed around the stud blanks and the belt blanks and stud blanks are sintered to obtain sheathed stud blanks;

(d) the sheathed stud blanks are disposed or have been disposed on the slip-resistant surface of the metal support and are welded to the support by heat-treatment, and (e) the sheathed stud blanks are simultaneously forged at over 400° C., reducing their height by at least 15% and thus obtaining the brake fittings.

"Moulding" means here shaping, usually in some sort of a mould.

The method of coating the surface of the metal support braze-welding is very important, not only for welding the studs to the support but also because it produces a catchy surface such that the stud blanks placed on the surface can be manipulated without slipping, even with slopes exceeding 10°. The manufactures studs (the sheathed studs in this case) normally have a height/diameter ratio of less than 2. Accordingly, depending on the manufacturing procedure, the stud blanks are placed on the support not later than (d) for welding, or at (c) for sintering and welding simultaneously, or better still at the beginning of (b) for moulding and compacting the friction powders directly on to the support and thus obtaining improved adhesion as a result of the compression work on the surface.

The following are the preferred conditions for the heat treatment, elimination of carbon and reduction in the method of coating by braze-welding and simultaneously obtaining an adhesive surface: carbon is eliminated normally between 300° and 550° C., and reduction, in a reducing atmosphere such as ($N_2+H_2$) is normally carried out at between 600° and 1000° C., resulting in a diffusion bonding of the braze-welding grains to the metal support.

After this treatment, the surface of the support has good adhesion and is ready for welding particles of powdered friction products to form the studs and metal powders forming the annular belts as per step (d).

In all its variants, therefore, the method according to the invention can be used to obtain a continuous weld between each sheathed stud and the metal substrate.

When, in the manufacture of brake linings of this kind, each sheathed stud is positioned by deformation by compression of the stud blank in a hollow or hole in the untreated the support, there is no adequate adhesion to the support. Now, the situation is completely modified by the braze-welding coating according to the invention. In the invention, the adhesion of the stud blank to the metal substrate is additionally improved by e.g. a frusto-conical stud and a corresponding hollow in the adhesive surface of the support. An aforementioned nipple, at the level of the lower end face or foot of the sheathed stud, normally has a radius equal to 5 to 30% of the radius of the sheathed stud. Each hollow, preferably open, in the substrate is bronze-welded and engagement of the nipple results in positioning and adhesion in the hollow even if the stud blank has been welded and compacted outside the support. The adhesion in the hollow in the support is particularly strong when the stud blank is compacted directly on to the catchy surface of the support. It has been found that in that case the stud blanks do not slide relative to the support even if the slope thereof exceeds 20°.

In order to improve the strength of the welded connection between the stud blanks and the support obtained by heat treatment in step (d), it is recommended to add a sub-layer of powdered bronze at the interface between the studs and the support or foot, the bronze being introduced when the powders forming the stud are moulded, and preferably also when the powders forming the annular belt are moulded (operation (b)).

The sub-layer of powdered bronze preferably has a thickness between 0.2 and 2 mm. Additional thickness does not appreciably improve the strength of the welded joint, but reduces the height of the friction products. The thickness of the sub-layer normally becomes 0.1 to 1.3 mm after subsequent compression of the sheathed stud blank.

The Applicants have found that if the belt blank is pressed against the stud blank during manufacture of a sheathed stud, trouble is caused by the belt bursting as a result of differences between the expansion of the stud and the belt during sintering. In novel manner, the annular belt blanks are made separately and the internal diameter of each annular belt or ring blank is chosen so that the diameter of the stud after sintering is between the internal diameter of the ring and the aforementioned diameter increased by about 1%, the result being a good connection between the stud and the belt without risk of bursting and without apparent swelling of the sheathed stud. The metal product forming the belts does not appreciably swell. In practice, in the aforementioned method, the internal diameter of the separately-manufactured annular belt blanks should be 1.005 to 1.05 times, most frequently 1.005 to 1.025 times, the external diameter of the stud blanks, the exact clearance being chosen in dependence on the nature of the materials used.

It may be preferable initially to sinter the annular belt blanks to improve their cohesion and additionally improve the dimensional regularity of the sheathed studs.

In the case where the powdered friction products and metal powders contain bronze, the powdered friction products containing powdered graphite and abrasive products and fluxes such as lead or glass bonded by bronze, and the metal powders containing bronze, cast metal and 0.4 to 10% graphite, the sintering heat treatment or treatments are carried out in a reducing atmosphere, normally between 700° and 900° C., and the welding treatment in step (d) is normally carried out between 750° and 1000° C. In step (b), when the stud blanks are moulded and compacted directly on to the adhesive surface of the metal substrate, the annular belt blanks in (c) are disposed around the stud blanks, so that their lower ends rest on the substrate, and simultaneously the stud blanks and belts are sintered and welded by heat treatment for 10 to 40 minutes at 750° to 1000° C. in a reducing atmosphere.

In the case where the powdered friction products and metal powders contain iron, the powdered friction products containing powdered graphite and abrasive products and fluxes such as lead or glass bonded with iron, and the metal powders containing iron, cast metal and 0.4 to 10°% graphite, the sintering heat treatment or treatments are carried out in a reducing atmosphere, normally between 850° and 1100° C., and the welding treatment in step (d) is normally carried out at between 900° and 1150° C. When the stud blanks are directly moulded and compacted on to the adhesive surface of the metal support it is preferable as before simultaneously to sinter and weld the stud blanks and annular belt blanks by heat treatment between 900° and 1150° C. in a reducing atmosphere.

The hot forging in step (e) increases the compactness of the sheathed stud blanks by deformation and interlocking of the grains. The height of the sheathed stud blanks is reduced by at least 15%, preferably by 25 to 35%. The resistance to wear or service life of the studs is increased. Hot forging is carried out at between 400° and 1050° C. in the case of iron-based studs. The forging tools have only a small clearance relative to the sheathed studs, as a result of the regularity of their diameter after sintering, the regularity being maintained after welding.

A further considerable improvement in the bond between the sintered, forged grains is possible by isostatic compression treatment and is strongly recommended. The treated fitting is immersed in a fluidised bed of refractory particles disposed in a heat-deformable sealing-tight container sealed in vacuo, the container being subjected to a pressure of at least 5 MPa at a temperature of at least 650° C.

In the case of "bronze bases", the temperature and pressure conditions are preferably between 5 and 25 MPa and between 700° and 950° C. In the case of "iron bases", the temperatures are higher, 850° to 1050° C., with similar pressures.

The isostatic compression treatment, which further increases the compactness and generalises the metal bonds between grains, multiplies the service life of the brake fittings according to the invention by 1.2 to 3.

The invention also relates to the brake fittings obtained as a result. In known manner, each fitting comprises a number of studs made of friction products and each sheathed by an annular sintered metal belt which is usually less fragile, the sheathed studs being non-contiguous and secured via their feet or respective bottom ends to a metal support. According to the invention, each sheathed stud is bonded to the substrate via the surface of its foot in a continuous metal join, in contract to prior-art studs which are secured by a weld bead or by a means such as a rivet. The studs according to the invention are also characterised by their geometrical regularity, particularly by the regularity of their shank. At their feet they frequently have a lower sub-layer of sintered bronze from 0.1 to 1.3 mm thick, producing excellent joining both to the metal support and to the portion of sheathed stud which surmounts and prolongs the support.

A brake fittings according to the invention also preferably has a nipple at the base of each sheathed stud and engaging in a hollow in the support, the metal connection between the support and the flat annular base of the sheathed stud extending at least over all the lateral surface of the nipple and the hollow. This continuous joining is obtained more particularly when the hollow, which is e.g. frusto-conical, engages a nipple having the same cone angle, or when the stud blank is directly compacted on to the metal support.

ADVANTAGES OF THE INVENTION

The arrangement of sheathed studs on the metal support of the brake fittings can be fixed with accuracy when the studs are moulded and compacted, or at latest before the studs are welded to the support by heat treatment. Owing to the adhesive surface of the metal support, the support loaded with stud blanks, whether surrounded or not by the sheath blank, can be carried from one work station to another or moved in a furnace without the stud blanks slipping;

The resulting sheathed studs, which are normally circular-cylindrical, have a regular shape and are extremely sound, without local swelling and without cracks. Large-scale forging becomes simpler.

The brake lining is much easier to manufacture, particularly in the case where the stud blanks are moulded and compacted directly on to the metal support, and in all cases owing to the absence of sliding of the blanks on the support during transport or manipulation. No tools are needed for holding the studs on the support for welding;

There is no longer any need to secure the sheathed stud by soldering or by any other securing operation, since the welding heat-treatment involves only the braze-welding product initially deposited on the metal support;

The service life of the brake fittings is preferably increased, normally by 30 to 100%, by additional hot isostatic compression.

DESCRIPTION OF THE PREFERRED EMBODIMENTS

Figure 1:
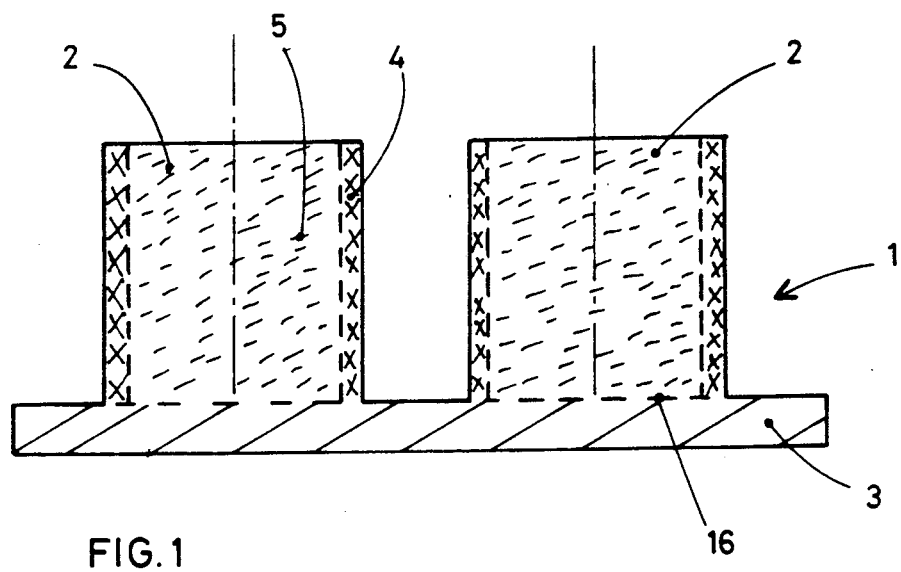
FIG. 1 shows a brake fitting according to the invention, in axial section along a number of sheathed studs.

FIG. 1 is a view in section of a railway brake fitting comprising nine sheathed studs 2 and conventionally called a "half-fitting" since the braking system comprises two symetrical fittings. The support 3 is made of steel and the bond 16 between the sheathed studs 2 and the support 3 is of metal, without oxides, and continuous.

The periphery of studs 2 is perfectly regular, but an examination in axial section shows that the annular metal belts 4 each sheath a stud 5 of friction products which is swollen in diameter by about 1.5% half way up. Belts 4 have not been damaged, since they already have a 1% clearance relative to the diameter of the stud blanks 5 before sintering.

Figure 2:
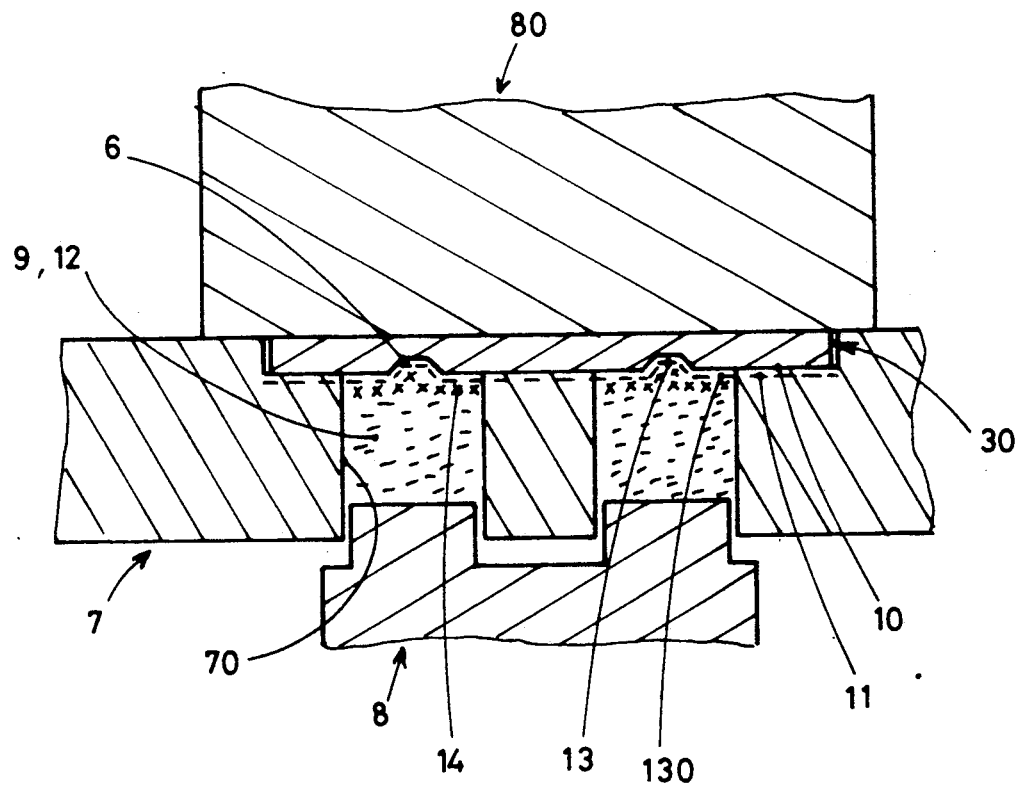
FIG. 2 shows the stud blanks being moulded and compacted on to a metal support in axial section.

FIG. 2 shows moulding or shaping and compacting of stud blanks 12, each centred on a recess 6 in the metal support 30, by tools 7 comprising cylindrical moulding cavities 70, a bottom punch 8 for compressing the powder and a top punch 80 which holds the tools 7 against the bed or support 30 when the compression punch 8 rises. At the end of the operation, a 1 mm thick layer 14 of powdered bronze is inserted into the moulding cavities 70, the powder 14 resulting in a very strong welded bond when welded by heating. The surface 10 of support 30 facing the powder 9 has been coated by bronze welding according to the invention and thus becomes a slip-resistant surface 10, and the adhesion of studs 12 on substrate 30 is also greatly improved by directly compacting the stud blanks 12 on to surface 10 and by protrusions 13, which project beyond the foot 130 of each stud 12.

Figure 3:
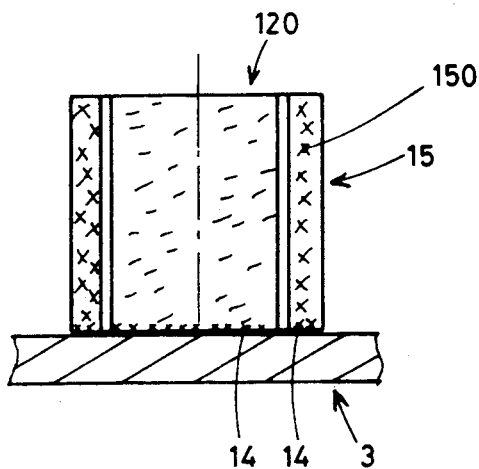
FIG. 3 shows another stud blank disposed on another metal support and surrounded by an annular belt blank before sintering and welding, in axial section.

FIG. 3 shows a stud blank 120 having a diameter of 31 mm and placed on a metal substrate 3 and surrounded by a metal belt blank 15 having an internal diameter of 31.5 mm and fitted and compacted separately from metal powders 150. Each blank comprises a sub-layer 14 of powdered bronze. The assembly 120, 15 and 3 is ready for sintering and welding.

Figure 4:
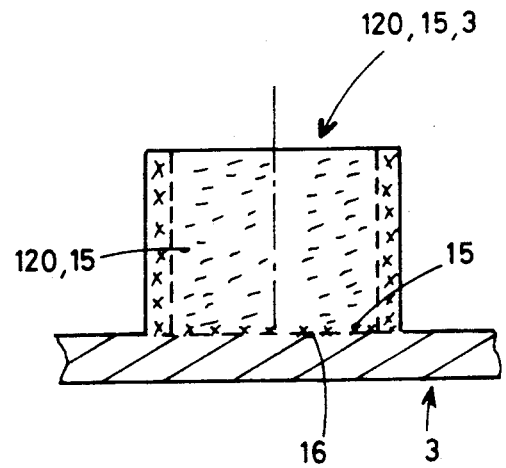
FIG. 4 shows the same stud after hot-forging, likewise in axial section.

FIG. 4 shows the assembly (120, 15, 3), the stud 120 and the belt 15 being bronze based, after sintering and welding heat-treatment in one operation at 920° C. for 20 minutes in a reducing atmosphere, and after forging at 750° C. with a 28% reduction in the height of the sheathed stud blank 120 and 15. The resulting sheathed stud 120 and 15 has a continuous metal bond 16 to the substrate 3, as a result of the braze-welding coating of the substrate 3 (e.g. at 11 in FIG. 2), and as a result of the reinforcement given by the sub-layer of bronze 15.

Figure 5A:
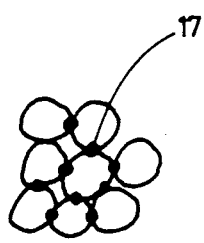
FIGS. 5a to FIG. 5c diagrammatically show the effect of the successive treatments on the metallurgical bonds between the grains of powder.
Figure 5B:
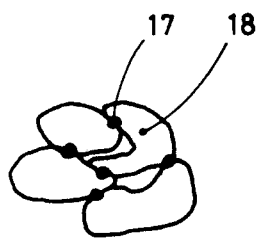
Figure 5C:
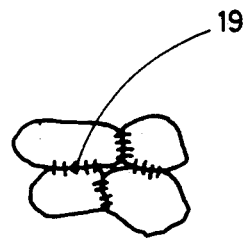

FIGS. 5a to 5c show the advantage of hot forging and of hot isostatic compression. The grains of powder, after being compacted and sintered (FIG. 5a) have metal bonds limited to the places of contact 17, since the initial cold compacting has not deformed the grains. In FIG. 5b, after hot forging, it can be seen that the grains 18 are compressed and deformed and interlocked. The overall compactness and strength are improved, but usually the metallurgical bonds 17 are not developed. In FIG. 5c, after hot isostatic compression, the grains have been formed and pressed against one another over considerable surface areas, resulting in "generalised" metallurgical joins 19. As can be seen, there is a great increase in the resistance to wear and the service life of the brake fittings treated by isostatic compression according to the invention.

Figure 6:
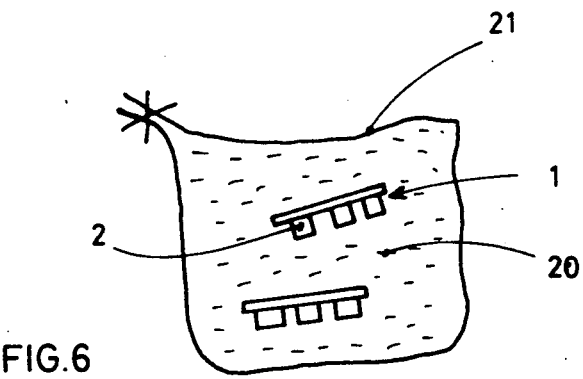
FIG. 6 shows the brake fittings according to the invention in a hot isostatic compression container, partly in section.

FIG. 6 shows brake fittings 1 immersed in a bed of fine refractory particles 20 placed in a sealing-tight steel container 21 sealed in vacuo. The fittings 1 are iron-based and in the present case are treated by isostatic compression by subjecting the filled container 21 to a pressure of 10 MPa at a temperature of 1020° C. After cooling and extraction of the blanks, the sheathed studs 2 of fittings 1 are modified as in FIG. 5c, with a surprising improvement in resistance to wear.

APPLICATION

The brake fittings according to the invention are normally used for braking railway or motor vehicles for brakes acting on discs, flanges or wheel tires, and for braking of aircraft, helicopters and industrial machines.

We claim:

1. A method for manufacturing a brake-fitting, comprising the steps of:
   a) obtaining a rigid metal support having a surface which is to receive a plurality of studs;
   b) making said surface slip resistance by degreasing and/or sanding, and subsequently coating with a suspension of a braze-welding powder in an organic liquid, hot oxidizing the coating to eliminate all traces of carbon therefrom, and reducing oxides formed by heat-treating the oxidized coating in a reducing atmosphere;
   c) molding and compacting powdered friction products to form stud blanks of known external diameter;
   d) molding and compacting metal powders to form annular belt blanks having an internal diameter 1.005 to 1.05 times the external diameter of the stud blanks;
   e) disposing each annular belt blank around a stud blank and sintering to form sheathed stud blanks;
   f) welding the sheathed stud blanks to the slip-resistant surface of the support by heat-treatment; and
   g) forging the welded, sheathed stud blanks, at over 400° C., reducing them by at least 15% in height, to obtain said brake-fitting.

2. A method according to claim 1, wherein the stud blanks (12) are moulded and compacted directly on on to the slip surface (10) of the metal support (30), the positioning of the studs on the support (30) not being modified during subsequent steps.

3. A method according to claim 1 or 2, wherein said metal support (30) comprises on its slip-resistant surface (10) recesses (6) for positioning sheathed studs (2), and wherein each stud blank (12) is formed with a protrusion (13) extending into a corresponding recess.

4. A method according to claim 1 or 2 wherein a sub-layer (14) of powdered bronze having an average thickness of 0.2 to 2 mm is introduced on the slip-resistant surface during the moulding of the stud blanks (12; 120) and the annular belt blanks (15).

5. A method according to claim 1 or 2, in which the annular belt blanks (15) are sintered after being compacted.

6. A method according to claim 1 or 2, where said forging is followed by hot isostatic compression of the brake fitting (1), by immersing the fitting (1) in a bed of refractory particles (20) placed in a heat deformable sealing-tight container (21) sealed in vacuo, and subjecting the container (21) to a pressure of at least 5 MPa and a temperature of at least 650° C.

7. A method according to claim 1 or 2 wherein the powdered friction products (9) and the metal powders (150) contain bronze, the powdered friction products contain powdered graphite and abrasive products and fluxes bonded by bronze, and the metal powders contain bronze, cast metal and 0.4 to 10% graphite.

8. A method according to claim 7 comprising simultaneously sintering and welding the stud blanks (120) and annular belt blanks (15) by heat treatment for 10 to 40 min at between 750° and 1000° C. in a reducing atmosphere.

9. A method according to claim 1 or 2, wherein the powdered friction products (9) and the metal powders (150) contain iron, the powdered friction products contain powdered graphite and abrasive products and fluxes bonded by iron, and the metal powders contain iron, cast metal and 0.4 to 10% graphite.

10. A method according to claim 9 comprising simultaneously sintering and welding the stud blanks and annular belt blanks (2) by heat treatment between 900° and 1150° C. in a reducing atmosphere.

11. A method according to claim 6 in which said hot isostatic compression takes place at between 5 and 25 MPa at a temperature between 700° and 950° C. where the sheathed studs (2) of the lining (1) are based on bronze, or at a temperature between 850° and 1050° C. in the case where the sheathed studs (2) are based on iron.

* * * * *